US006721325B1

(12) United States Patent
Duckering et al.

(10) Patent No.: US 6,721,325 B1
(45) Date of Patent: Apr. 13, 2004

(54) FAIR SHARE SCHEDULING OF MULTIPLE SERVICE CLASSES WITH PRIORITIZED SHAPING

(75) Inventors: Brent G. Duckering, Vancouver (CA); Rob E. Robotham, Ottawa (CA)

(73) Assignee: Alcatel Canada Inc., Kanato (CA)

( * ) Notice: Subject to any disclaimer, the term of this patent is extended or adjusted under 35 U.S.C. 154(b) by 0 days.

(21) Appl. No.: 09/064,623

(22) Filed: Apr. 23, 1998

(51) Int. Cl.[7] .......................... H04L 12/28; H04L 12/56
(52) U.S. Cl. .................. 370/395.4; 370/412; 370/230.1
(58) Field of Search ................................. 370/229, 230, 370/231, 232, 233, 235, 389, 395, 400, 412, 429, 394, 395.4, 395.41, 395.42, 395.43, 235.1, 230.1

(56) References Cited

U.S. PATENT DOCUMENTS

| | | | | |
|---|---|---|---|---|
| 5,260,935 A | * | 11/1993 | Turner | 370/394 |
| 5,339,311 A | * | 8/1994 | Turner | 370/394 |
| 5,499,238 A | * | 3/1996 | Shon | 370/399 |
| 5,570,348 A | | 10/1996 | Holden | |
| 5,602,830 A | | 2/1997 | Fichou et al. | |
| 5,629,937 A | | 5/1997 | Hayter et al. | |
| 5,724,513 A | | 3/1998 | Ben-Nun et al. | |
| 5,748,614 A | * | 5/1998 | Wallmeier | 370/235 |
| 5,757,771 A | * | 5/1998 | Li et al. | 370/235 |
| 5,831,971 A | * | 11/1998 | Bonomi et al. | 370/230 |
| 5,831,980 A | * | 11/1998 | Varma et al. | 370/395 |
| 5,982,748 A | * | 11/1999 | Yin et al. | 370/232 |
| 6,031,822 A | * | 2/2000 | Wallmeier | 370/235 |
| 6,094,687 A | * | 7/2000 | Drake, Jr. et al. | 709/241 |

OTHER PUBLICATIONS

John M. Peha, "The Priority Token Bank: Integrated Scheduling and Admission Control for an Integrated–Services Network", May 23, 1993, pp. 345–351.
Jennifer Rexford, "Scalable Architectures for Integrated Traffic Shaping and Link Scheduling in High–Speed ATM Switches", Jun. 1, 1997, vol. 15, No. 5, pp. 938–950.

* cited by examiner

Primary Examiner—Douglas Olms
Assistant Examiner—Bob A. Phunkulh
(74) Attorney, Agent, or Firm—Marks & Clerk

(57) ABSTRACT

An apparatus for scheduling multi-service category ATM cell traffic through contention points in an ATM network is provided. The service categories have predefined delivery priorities according to quality of service guarantees. To satisfy these priorities while maintaining fair treatment to low priority connections, aging markers are incrementally assigned to queued cells and these markers in combination with priority data are used to determine which connection is serviced next. A method of scheduling traffic through the network is also disclosed.

16 Claims, 3 Drawing Sheets

FAIR SHARE SCHEDULING OF MULTIPLE SERVICE CLASSES WITH PRIORITIZED SHAPING

FIELD OF THE INVENTION

This invention relates to systems and methods for fairly arbitrating between multiple scheduled events and more particularly to systems and methods for the fair-share scheduling of multiple service categories at queuing or congestion points in an ATM network.

BACKGROUND OF THE INVENTION

Asynchronous transfer mode (ATM) is gaining rapid recognition as the technology of choice for the transmission of broadband information. The fixed length cell size employed in ATM technology supports the delivery of a wide range of multimedia information including speech, video and data. In order to service this wide variety of information the ATM Traffic Management Forum has specified that ATM traffic be divided into five service categories. Two of these service categories are for real-time transmission, namely constant bit rate (CBR) and real-time variable bit rate (rtVBR). There are, as well, three non-real-time categories, namely non-real-time variable bit rate (nrt-VBR); unspecified bit rate (UBR) and available bit rate (ABR).

As the various service categories are designed to carry different types of information, different Quality of Service (QoS) parameters apply. The ATM Traffic Management Forum has listed six Quality of Service parameters namely: peak-to-peak Cell Delay Variation (peak-to-peak CDV); maximum Cell Transfer Delay (Max CTD); Cell Loss Ratio (CLR); Cell Error Ratio (CER); Severely Errored Cell Block Ratio (SECBR) and Cell Misinsertion Ratio (CMR). Of these six, two are of greatest concern when scheduling. These are the maximum Cell Transfer Delay (Max CTD) and Cell Delay Variation (CDV). Traffic of different service classes, and even traffic of the same service class may have different delay requirements. Fair scheduling between connections of the various ATM service categories onto a single resource while meeting the multiple Quality of Service delay guarantees is difficult to achieve.

One prior art method for scheduling such traffic, known as shaping, involves calculating a theoretical emission time (TET) for each active connection and attempting to service each connection as close to that theoretical emission time as possible. Unfortunately, most connections cannot be serviced exactly at their TET due to finite output time requirements for the shared resource, as well as scheduling collisions where multiple connections are scheduled to output at the same time. Though the finite output times cannot be avoided, the effects of scheduling collisions can and should be reduced through prioritization. Without prioritization, a connection with loose delay requirements may actually get serviced prior to a connection with tight delay requirements scheduled at the same TET.

One proposed solution to this problem is to use two or more shaping devices (or shapers) to schedule the connections where connections with similar Quality of Service delay requirements are scheduled in the same shaper. Exhaustive servicing is commonly used to determine which shaper gets to send a cell at any given time. Prioritized shaping is discussed in U.S. application Ser. No. 08/873,064, now U.S. Pat. No. 6,064,650, which is based on provisional application No. 60/020,642 filed Jun. 27, 1996. The contents of the aforementioned application are incorporated herein by reference. When more than one calendar (as defined in the aforementioned application) contains a connection ready to send a cell, only the highest priority calendar gets to transmit. All lower priority calendars have to wait until all calendars with higher priority have nothing ready to send. This calendar prioritization can be based upon the CDV and possibly max CTD requirements of the traffic scheduled in each calendar. There are, however, certain limitations which can be identified in connection with the aforementioned multiple shaper or calendar solution. For example, there is no quantitative link between the CDV and max CTD requirements between each shaper's traffic and the prioritization of that shaper respective of all other shapers. When a high priority shaper schedules several connections over a relatively short transient period, lower priority shapers have to wait until this transient finishes before they can resume sending cells from their connections. During these transients, low priority connections may violate their delay requirements while those scheduled on high priority shapers may actually beat their delay requirements. Thus, high priority connections may actually better their QoS at the expense of lower priority connections. To properly support QoS delay requirements, shaper priorities must be dynamically assigned based upon the amount of time that their connections have been delayed from ideal theoretical emission times.

Further, heretofore traffic is either shaped or placed in work-conserving, weighted-fair-queues. Shaping works well for real-time traffic where rates are explicitly guaranteed and weighted-fair-queuing works well for non-real-time traffic that does not need to be prioritized or rate limited. However, most non-real-time traffic has an associated minimum rate that must be guaranteed and a maximum rate that cannot be exceeded. It is also often desirable to provide work conservation between these two limits to ensure full resource usage as precise instantaneous bandwidth availability is rarely known for non-real-time traffic. An example would be non-real-time variable bit rate where the minimum guaranteed scheduled rate is sustainable cell rate (SCR) though output rate will be lower when an upstream source sends below SCR. The maximum rate is peak cell rate (PCR) with an associated burst tolerance (BT) that must be respected. In this case it is not desirable to simply shape up to PCR as this may infringe upon rate guarantees of the available bit rate (ABR) and possibly unspecified bit rate (UBR) connections. On the other hand, it is also not desirable to simply shape to SCR as this does not allow the non-real-time variable bit rate connection to make use of any additional unused bandwidth. This minimum rate guarantee with work conservation up to a maximum rate cannot be provided for by shaping or weighted-fair-queuing alone.

Furthermore, scheduling using a single device, namely a shaper or a weighted-fair-queue, does not provide proper support for rate-based backpressure where all non-real-time connections are throttled back to minimum required rates. Weighted-fair-queuing by itself is not able to throttle back all connections due to its work-conserving nature, while shaping is far too slow to respond. For a shaper to throttle back the rates of all connections scheduled, these connections would either have to be descheduled and rescheduled with a longer period or the shaper would have to wait for each connection to be serviced before rescheduling it with a longer period. At the conclusion of the backpressure, the same procedure would have to be followed for increasing the rates of the connections. As thousands of connections may be scheduled these procedures would take a very long time to complete. The net effect is an increased delay in the control loop which is therefore harder to stabilize.

SUMMARY OF THE INVENTION

It is therefore an object of the present invention to provide fair share scheduling of multiple scheduled events of different service classes with exhaustive by age priority servicing.

It is a further object of the present invention to provide fair share scheduling with work conservation and prioritized minimum rate.

It is also an object of the present invention to provide fair share scheduling and peak rate limiting.

Therefore in accordance with a first aspect of the present invention there is provided an apparatus for arbitrating service between contending multiple scheduled events each having a predefined service delivery priority and a preset delay factor, where the delay factor corresponds directly to the CDV, and also relates to max CTD. Note that max CTD is also a function of the variance in the input stream since shapers use delay to smooth out this variance. The apparatus comprises queuing means to place sequential events in per sequence queues; scheduling means to determine sequence service times and to group sequences of similar service quality; aging means to monitor sequence groups and to record aging components for each group, each aging component representing the largest delay suffered by the sequences in the group; and servicing means to selectively service a sequence having the highest aggregate of service priority and aging component.

In accordance with a second aspect of the present invention there is provided an apparatus for arbitrating between service connections at a contention point in an ATM network, the service connections including multiple service categories each with predefined Quality of Service guarantees. The apparatus comprises queuing means for arranging sequential items in per sequence queues; scheduling means to determine sequence service times and to group sequences of similar service quality; aging means to monitor sequence groups and to introduce aging markers to sequence groups that have been waiting the longest to send; and servicing means to selectively service a sequence having the highest aggregate of service priority and aging markers.

In a preferred embodiment of this aspect of the invention the scheduling means includes parallel shaper and weighted-fair-queuing means for specific service categories whereby the shaper provides a minimum rate guarantee and the weighted-fair-queuing means provides optimum bandwidth usage.

In accordance with a further embodiment of this aspect of the invention shaping means may also be provided to limit peak rate offered to sequences by the weighted-fair-queuing means.

In accordance with a third aspect of the present invention there is provided a method of fairly scheduling sequential events of various service categories at a queuing point in an ATM network in order to satisfy Quality of Service guarantees. The method comprises the steps of placing sequential events into per-sequence queues; prioritizing the per-sequence queues in sequence groups of similar service quality; recording a timing marker for each sequence group, the timing marker representing the largest delay suffered by the sequences in the group; accumulating priority and timer marker data respecting each group; and selectively servicing the sequence having the highest aggregate of service priority and timing markers.

BRIEF DESCRIPTION OF THE DRAWINGS

The invention will now be described in greater detail with reference to the attached drawings wherein.

DETAILED DESCRIPTION OF THE INVENTION

Figure 1:
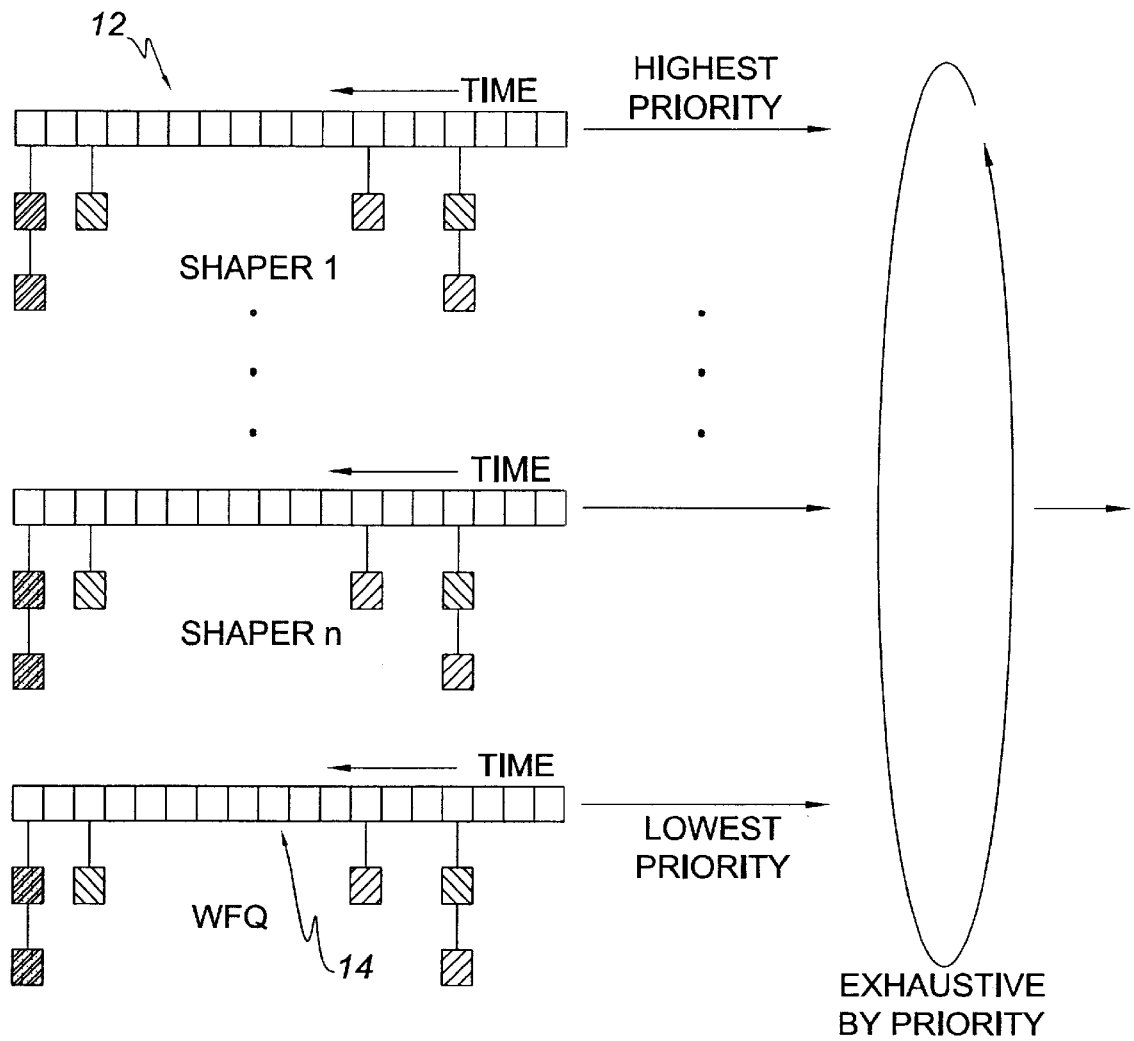
FIG. 1 is a sample multiple calendar scheduler according to the prior art.

FIG. 1 demonstrates an implementation of a prior art queue servicing solution using multiple shaping calendars 12 which constitutes a particular form of a traffic shaper. The calendars 12 are prioritized. When more than one calendar 12 contains a connection ready to send a cell only the highest priority calendar gets to transmit. All lower priority calendars have to wait until all calendars with higher priority have nothing ready to send. In FIG. 1 a low priority weighted-fair-queuing (WFQ) scheduler 14 which could be in the form of a calendar, a tag comparator or other WFQ method has been added to provide work-conserving support for low priority connections such as UBR. Calendars could be divided based upon the traffic type (real-time or non-real-time) service category (CBR, rtVBR, nrt-VBR, ABR, UBR) delay requirements (such as CDV and max CTD) requirements or a combination of these such as delay requirements for real-time traffic and service category for non-real-time traffic. Since Quality of Service (QoS) can be related to network node CDV and max CTD requirements, dividing calendars within the node based upon these requirements prioritize traffic based upon QoS.

Generally speaking, traffic with tight CDV requirements should be transmitted as close to the theoretical emission time as possible. However, if several connections with tight CDV are scheduled in proximity to each other and receive exhaustive priority, it is possible that a connection with a larger CDV scheduled near the beginning of the high priority group may get delayed beyond its CDV requirement.

To avoid this, in accordance with the present invention, an aging factor is added which allows low priority large CDV connections to boost their priority as they get delayed close to the CDV limit for the node. An exhaustive by age priority servicing method is used to service between the multiple shapers. This will also limit max CTD for connections on lower priority shapers, though quantizing max CTD for shaped traffic requires knowledge of the traffic pattern at the input of the shaper.

In the following description reference is made to calendars. As used herein a calendar is a traffic shaping entity which, in effect, defines a succession of time intervals, in each of which are identified queues to be serviced during that interval.

Figure 2:
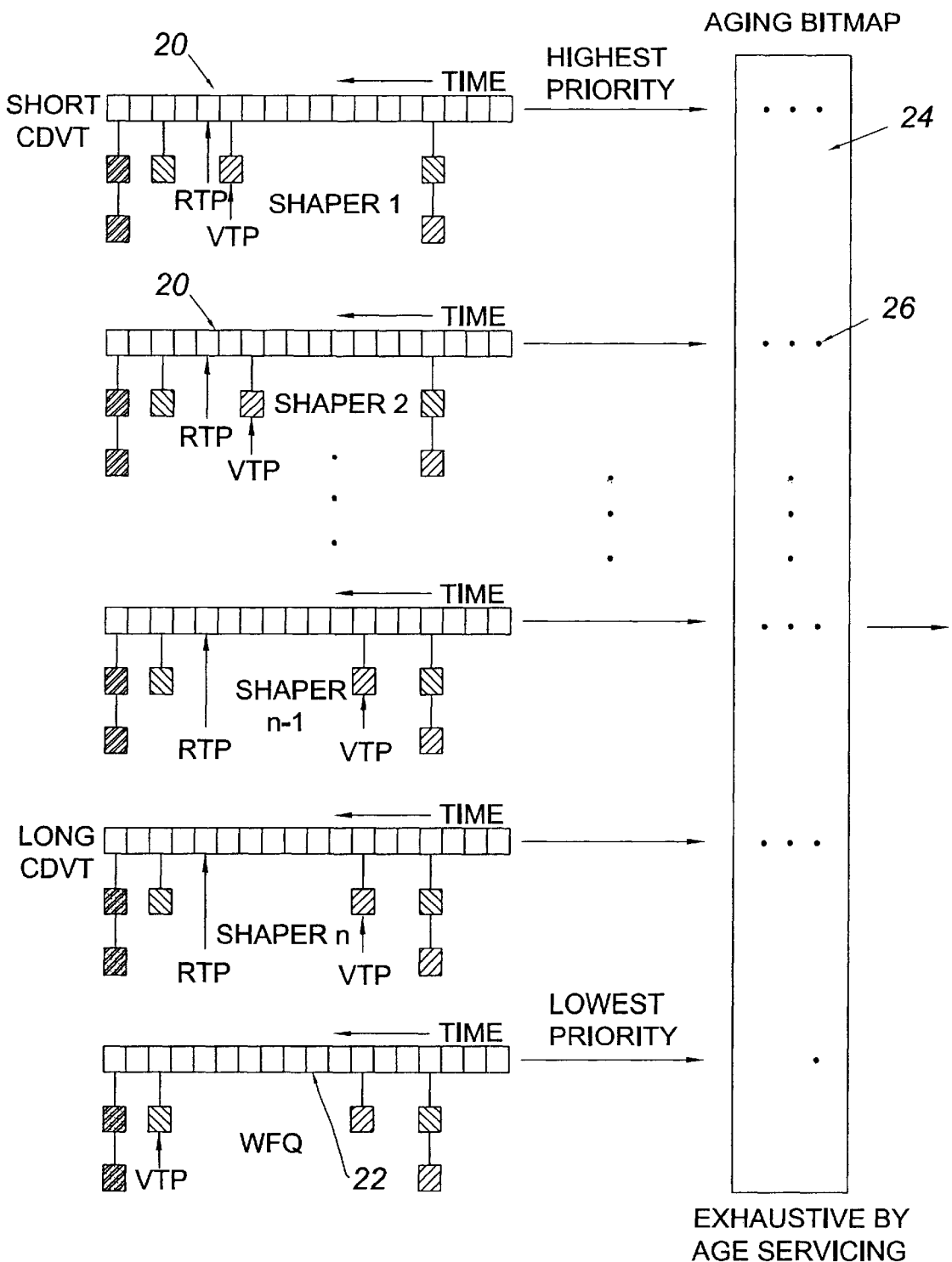
FIG. 2 illustrates exhaustive by age priority servicing according to the present invention.

FIG. 2 demonstrates one implementation of exhaustive by age priority servicing. Connections are shaped using multiple calendars 20, where each calendar has a programmable 1-point CDV associated with it. The 1-point CDV is described in ATM Forum's Traffic Management Specification Version 4.0. In the multiple calendar architecture illustrated in FIG. 2 the position of each queue within the calendar is determined by the Generic Cell Rate Algorithm (GCRA) also defined in the aforementioned ATM Forum's Traffic Management Specification. In this example a WFQ calendar 22 is also available to provide work conservation for low priority connections, though no aging is associated with it. One or more age thresholds are provided for each shaping calendar to support aging as the calendar gets behind in service relative to TET. One threshold could be set at or near the desired CDV limit for the calendar, while any others could be set above and/or below the CDV to provide additional resolution. An aging bitmap 24 is associated with the group of calendars, with one bit 26 per threshold per calendar, plus one additional bit per calendar to indicate that the calendar has a connection ready to be serviced.

When a calendar reaches the time where a connection is scheduled to transmit, the first bit in the age bitmap is set to indicate that a connection is ready. If the connection cannot be serviced due to other connections waiting in higher priority calendars, additional bits will be set in the bitmap as each aging threshold is crossed. When determining which connection should be serviced next, the aging bitmap is read and the earliest scheduled connection on the highest priority calendar with the highest count of age bits set is serviced. This assumes age takes precedence to priority. At this point the age bitmap is updated if necessary to reflect the servicing.

This example demonstrates the use of a two pointer shaper for determining how far behind each calendar is. The Real Time Pointer (RTP) points to the ideal service point, while the Virtual Time Pointer (VTP) points to the actual service point. The RTP constantly increments at fixed intervals, whereas the VTP points to a particular time slot in the calendar which defines the next connection, i.e. cell to be serviced. The VTP can only be incremented if a connection is serviced from the calendar or if the RTP increments and there are no connections ready to be serviced. The distance between the two pointers determines currently how delayed the oldest connection is from its TET, and can be calculated every time the RTP increments.

It would be possible to use this aging mechanism for other implementations of shapers as well. For example, if connections are removed from the calendar as soon as their TET is reached and placed in a queue associated with the calendar until they can be serviced, their TET values can be used to set the aging bits. In this case, the connection at the head of the queue is the oldest, and its TET value can be compared to the current time and aging thresholds in order to set the aging bits. Furthermore, the shaper does not have to take the form of a calendar.

Although this example demonstrates the use of exhaustive by age priority servicing as it relates to shaping ATM connections, the same principles can be used for any application where multiple scheduled events have to be arbitrated between based upon priority and delay variances.

This method provides a much better means of ensuring that CDV requirements are not violated during scheduling collisions, as compared to simple exhaustive servicing. Large scheduling collisions in high priority calendars will not be able to starve lower priority connections. CDV limits for all priorities can be guaranteed assuming the scheduler is not overbooked, unlike exhaustive servicing that can only guarantee CDV limits to higher priority connections when the scheduler is more than minimally booked.

Implementing additional threshold levels below network node CDV requirements provides a better means to distribute the effects of a minor scheduling collision among all priorities, as opposed to only involving low priority traffic until CDV limits have been reached. Implementing additional threshold levels above CDV can minimize the relative size of CDV violations by distributing violations across all priorities during excessive scheduling collisions, instead of violating only low priority connections. Of course for some traffic classes it may be more desirable to avoid CDV violations for higher priority traffic at the expense of large CDV violations for lower priority traffic during large collisions, instead of spreading the violations equally. In this case aging threshold levels above CDV may not be acceptable. Thresholds can also be set to differentiate between calendars shaping non-real-time traffic, although these thresholds should be large enough to prevent non real-time traffic from ever obtaining higher priority than real-time traffic.

By scheduling a connection with both a shaper and a WFQ at the same time, it is possible to provide a minimum rate guarantee with work conservation providing any additionally available bandwidth. The shaper will shape to the minimum rate, while the WFQ provides everything above. This supports rate-based backpressure, where the non-real-time traffic can be throttled back to minimum rates simply by halting service of the WFQ.

Figure 3:
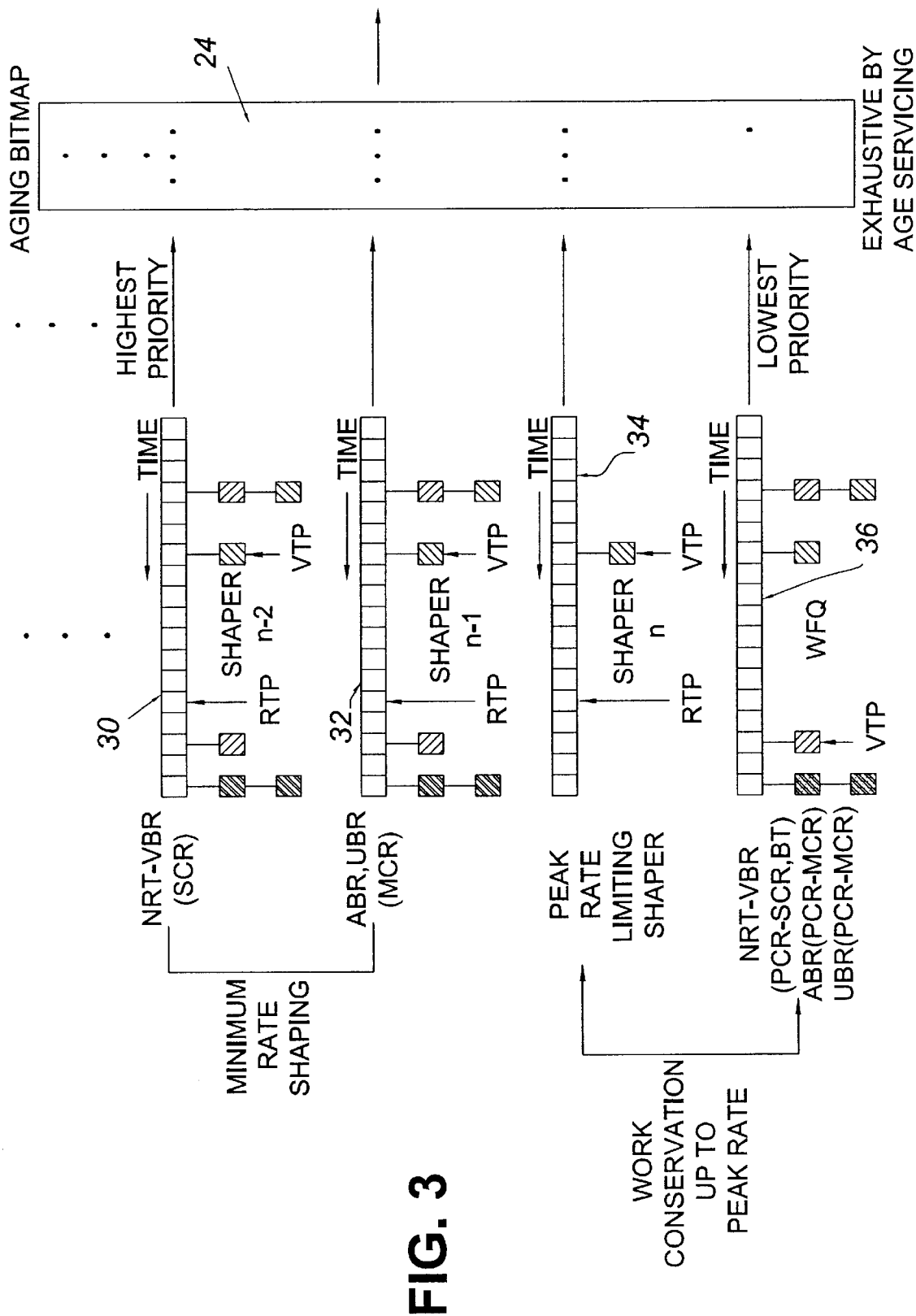
FIG. 3 shows work conservation with prioritized minimum rate and rate limiting.

FIG. 3 demonstrates a sample configuration for work conservation with prioritized minimum rate and peak rate limiting. In this example the nrt-VBR is shaped at SCR in a separate calendar 30 from the calendar 32 for ABR and UBR. This gives the nrt-VBR priority during transients where insufficient bandwidth is available to provide minimum rates to all three non-real time classes. Aging can be utilized to prevent the ABR and UBR from being starved completely during the transients. ABR and UBR are shaped to their MCR values. In FIG. 3 a separate shaper is provided for peak rate limiting as will be discussed later. WFQ weights are set to provide a fair-share of the remaining bandwidth to all of the non-real-time connections. This example assumes that fair-share is relative to the difference between the peak rate and the minimum rate. If the fair-share calculations for ABR explicit rate (ER) calculations differs from this, the WFQ weights might have to be modified accordingly.

When scheduling on two calendars 30, 36 simultaneously, care must be taken to ensure that cell sequence integrity is maintained, and that empty cells are not inadvertently sent out due to connections with only one cell queued being scheduled on two calendars. Cell sequence integrity can easily be preserved by scheduling connections rather than cells. This ensures that the cell at the head of the queue is first to go out regardless as to which of the two calendars is first to service the connection. There is always a possibility that a connection with only one cell queued can be scheduled in two calendars, though the probability of this can be substantially reduced. When a cell arrives to an empty queue, the connection need only be scheduled in the shaper. If the shaper sends this cell out before the next cell arrives, then the connection again only needs to be scheduled in the shaper since the cells are arriving at or below the minimum rate. However, if another cell arrives prior to the first being sent, the connection should be scheduled into the WFQ as well. After this, the connection will be rescheduled every time it is serviced by either calendar until the connection's queue empties. When a queue that is scheduled in two calendars empties, the connection will have to be removed from the calendar in which it is still scheduled. This descheduling will have to occur prior to the next output cell time to ensure that the empty queue is not accidentally serviced.

As WFQ is work conserving, there may be a need to limit peak rates. Peak rate limiting can be achieved by rescheduling, with a shaper 34, connections that have been serviced too early by the WFQ 36. To determine that a connection has been serviced too early by the WFQ 36, a theoretical emission time can be calculated based upon the peak rate at each emission time, and compared to the actual emission time (AET). If the AET is less than the TET, the connection has been serviced too early and will have to be scheduled in the shaper 34 at an emission time of TET offset by the period corresponding to the peak rate. After the connection has been serviced by the shaper, the average rate over two cell times is no longer in violation of the peak rate, so the connection can again be scheduled in the WFQ 36, assuming more cells are available. This provides for a maximum CDV of one peak rate cell time in addition to the maximum CDV provided by the shaper, and ensures that the peak rate is never violated over a two cell emission interval.

For the sample configuration of FIG. 3, shaper n (34) provides for peak rate limiting the output of the WFQ 36. Depending on design limitations, it may be possible to use one of the minimum rate shapers to also provide for peak rate limiting if it is possible to schedule the same connection twice within the same calendar. If not, the separate peak rate shaper will only get utilized when the WFQ is sufficiently underbooked.

In this sample configuration, the peak rate for nrt-VBR is PCR-SCR, but this must also respect the burst tolerance. To ensure nrt-VBR burst tolerance (BT) is not exceeded, credits ($t$) can be accumulated whenever the connection sends at less than SCR, up to a limit of BT. Only if there are enough credits accumulated for the transmission of at least one cell at PCR will the VBR connection be eligible for scheduling in the WFQ calendar. Credits are subtracted every time the connection is serviced by the WFQ calendar. As soon as there are insufficient credits, the connection will no longer be eligible for WFQ scheduling until its queue runs empty, as a non-empty queue indicates that the connection is still being shaped to SCR.

By rescheduling connections that have reached their peak rates in a shaper, connections can be capped at their peak rates independently of their weights in the WFQ. This independence from WFQ weights allows connections that have small peak rates relative to their WFQ weights to be capped without interfering with the work-conserving service of those connections with relatively high peak rates.

Although specific embodiments of the invention have been described and illustrated it will be apparent to one skilled in the art that various modifications can be made to these embodiments without departing from the basic inventive concepts. It is to be understood that such modifications, to the extent possible, fall within the scope of the invention as defined by the appended claims.

What is claimed is:

1. An apparatus for arbitrating service between multiple scheduled events having a present delay factor in order to provide fair share scheduling, said apparatus comprising:

means to place sequential items in per sequence queues;

scheduling means to determine sequence service times and to group sequences of similar service quality;

aging means to monitor sequence groups and to record, based on one or more thresholds set in relation to said preset delayed factor, aging components for each group, said aging components determined by comparing said determined sequence service time with a theoretical emission time for each sequence; each of said aging components representing the largest delay suffered by sequences in said group; and servicing means employing exhaustive by age priority servicing to service a sequence having the highest aging components.

2. An apparatus as defined in claim 1 wherein said delay factor corresponds directly to Cell Delay Variation (CDV).

3. An apparatus as defined in claim 1 wherein said delay factor relates to maximum Cell Transfer Delay (maxCTD).

4. The apparatus as claimed in claim 1 for use in an ATM network in order to provide fair share scheduling for multiple service categories each with predefined quality of service guarantees.

5. An apparatus as defined in claim 1 wherein said scheduling means includes multiple shaping means.

6. An apparatus as defined in claim 5 further including one or more work-conserving means.

7. An apparatus as defined in claim 5 wherein said shaping means are shaping calendars.

8. An apparatus as defined in claim 6 wherein said work-conserving means is a weighted-fair-queuing scheduler.

9. An apparatus as defined in claim 4 wherein said aging means introduces multiple aging markers to each sequence group, an aging marker being added each time a time interval is passed without said connection being serviced.

10. The apparatus as defined in claim 8 wherein said shaping means provides a minimum rate guarantee and said weighted fair queuing scheduler provides optimum bandwidth usage.

11. An apparatus as defined in claim 10 wherein said shaping means and said weighted fair queuing means supports rate controlled backpressure for specific service categories.

12. An apparatus as defined in claim 10 wherein said specific service categories may be scheduled in either a shaper or a weighted fair queuing scheduler in order to limit the peak cell delivery rate.

13. The apparatus as defined in claim 1 wherein said multiple scheduled events have a service delivery priority and the servicing means employs exhaustive by age servicing to selectively service a sequence having the highest aggregate of service priority and aged components.

14. A method of fairly scheduling sequential events of various service categories at a queuing point in an ATM network in order to satisfy Quality of Service guarantees, the method comprising:

placing sequential events into per sequence queues;

prioritizing said per sequence queues in sequence groups of similar service quality;

recording a timing marker for each sequence group, said timing marker determined by comparing a scheduled sequenced service time with a theoretical emission time for said events, said timing marker based on one or more age thresholds, representing the largest delay suffered by said sequence queue in said sequence group; and accumulating priority and timing marker data respecting each group;

employing exhaustive by age priority servicing to selectively service the sequence queue having the highest aggregate or priority and timing markers.

15. A method of arbitrating service between multiple scheduled events having a delay factor in order to provide fair share scheduling, the method comprising:

placing sequential items in per sequence queues;

determining, using scheduling means, sequence service times of sequences of similar service quality;

monitoring sequence groups to determine, based on one or more thresholds set in relation to said delayed factor, aging components for each group, the aging components determined by comparing the determined sequence service time with a theoretical emission time for each sequence, each of the aging components representing the largest delay suffered by sequences in the group; and servicing, employing exhaustive by age priority servicing, a sequence having the highest aging components.

16. The method as defined in claim 15 wherein the multiple scheduled events have a service delivery priority and the servicing employs exhaustive by age servicing to selectively service a sequence having the highest aggregate of service priority and age components.

* * * * *